United States Patent [19]

Conant

[11] Patent Number: 4,742,213
[45] Date of Patent: May 3, 1988

[54] CREDIT CARD READING APPARATUS WITH RELIABLE OPTICAL PATH INTERRUPT MEANS

[75] Inventor: Curtis T. Conant, Rancho Palos Verdes, Calif.

[73] Assignee: American Magnetics Corporation, Carson, Calif.

[21] Appl. No.: 737,197

[22] Filed: May 23, 1985

[51] Int. Cl.⁴ .................. G06K 7/10; G06K 13/067
[52] U.S. Cl. .................................. 235/449; 235/436; 235/482; 250/557
[58] Field of Search ............... 235/449, 475, 482–486, 235/436, 476; 271/236; 250/557, 229; 356/400

[56] References Cited

U.S. PATENT DOCUMENTS

| | | | |
|---|---|---|---|
| 3,705,396 | 12/1972 | Nagaki et al. | 235/485 |
| 3,949,219 | 4/1976 | Crouse | 250/229 |
| 4,020,325 | 4/1977 | Pfost et al. | 235/449 |
| 4,151,564 | 4/1979 | Schreiber et al. | 235/449 |
| 4,358,672 | 11/1982 | Hyatt et al. | 235/484 |
| 4,394,568 | 7/1983 | Nakatsu | 235/475 |
| 4,526,309 | 7/1985 | Taylor et al. | 271/236 |

OTHER PUBLICATIONS

IBM Technical Disclosure Bulletin, "Card Registration Sensing Device", Graham et al., vol. 9, No. 7, 12/66.

Primary Examiner—Raymond F. Cardillo
Assistant Examiner—Robert A. Weinhardt
Attorney, Agent, or Firm—Marmorek, Guttman & Rubenstein

[57] ABSTRACT

A card reader includes an opaque arm movable in response to the insertion of a credit card. The arm, when moved, interrupts a light path signalling the presence of the card thus permitting write or read operations on a magnetic stripe on the card. The use of arm permits highly reliable operation due to the location of the light path defining devices in a place where they are protected from contaminants. In addition, the light path is always interrupted with an obstruction of known opacity.

6 Claims, 3 Drawing Sheets

CREDIT CARD READING APPARATUS WITH RELIABLE OPTICAL PATH INTERRUPT MEANS

FIELD OF THE INVENTION

This invention relates to light sensitive (Photonic) circuits and, more particularly, to such circuits which are interrupted by mechanical means.

BACKGROUND OF THE INVENTION

Light sensitive circuits are well known in the industry. Typically, such a circuit includes a light source such as a light emitting diode (LED) which directs light towards a light sensor. Light completes a circuit which enables (or disables) some control circuit until the light path is interrupted. In most instances, the light path is interrupted by introducing an opaque object between the LED and the light sensor.

Such apparatus is used for example to sense the presence of a credit card. A card in this instance, might be inserted in a slot in a manner to interrupt a light path between an LED and a light sensor. But LED's and light sensors in such apparatus are exposed to contaminants which coat the sensitive surfaces of the devices and thus degrade the ability of the devices to discriminate between the presence and absence of a card. Further, cards exhibit varying degrees of opacity. In view of the fact that the performance of the LED's and sensors also varies with time, it becomes clear that credit card readers including such LED's and sensors require considerable maintenance if they are to perform continually at commercially acceptable levels.

BRIEF DESCRIPTION OF THE INVENTION

In accordance with the present invention a card inserted into a slot in a credit card reader engages an associated end of a spring loaded arm. The remote end of the arm moves to interrupt a light beam between a LED and a light sensor in response. The removal of the card permits the movement of the arm from a position obstructing the light path. The simple expedient of using the arm permits the LED and the light sensor to be located in a relatively clean environment and the arm always obstructs the light beam with a means having a constant opacity. Reliability is increased and maintenance is reduced as a result. Of course, more than one arm and associated LED and sensor may be used so that several independent light paths can be obstructed by the insertion of a card.

DETAILED DESCRIPTION

Figure 1:
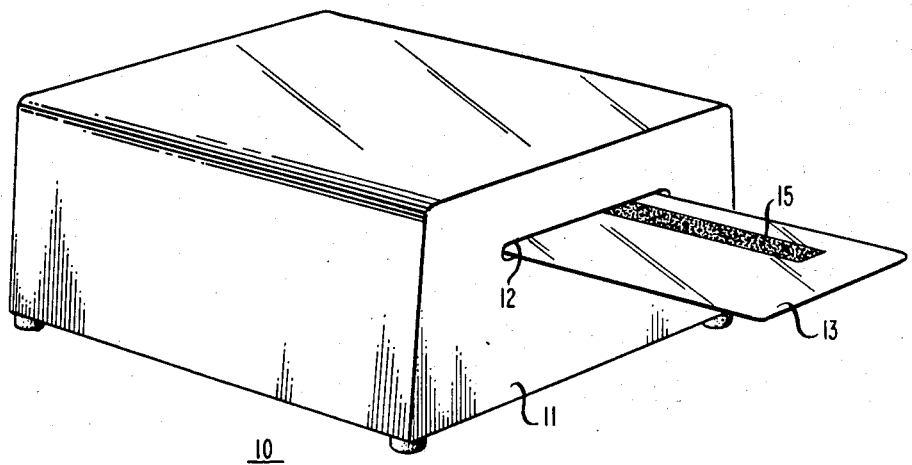
FIG. 1 is a projection view of a card reader in acordance with this invention.

FIG. 1 shows a card reader 10 including a face plate 11 in which a slot 12 is defined. Slot 12 is of a size to allow the insertion of a card 13. Card 13 is, conveniently, a familiar credit card with a magnetic stripe 15 on its surface as show in the FIG.

Figure 2:
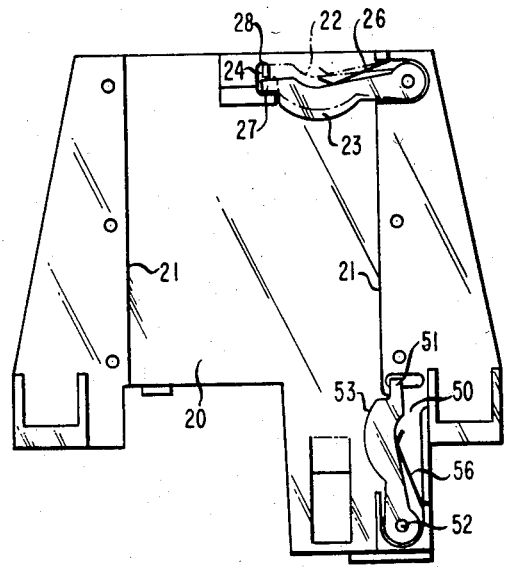
FIG. 2 is top view of a portion of the reader of FIG. 1 showing the card channel-defining and support means for the arm arrangement.

FIG. 2 shows a top view of a channel-defining and support means 20. Means 20 is positioned in reader 10 so that channel 21 on a top face of means 20 receives a card inserted at 12. An arm arrangement 22 is mounted on means 20 so that a card, fully inserted, engages arm 23 and moves it from its normal position (shown at 23) to the position shown at 24. Arm arrangement 22 includes a spring 26 operative to return the arm to its original position when card 13 is removed. The arm includes a remote portion 27 bent into a position orthogonal to the main body of the arm 22 and extending through hole 28 and beneath means 20.

Figure 3:
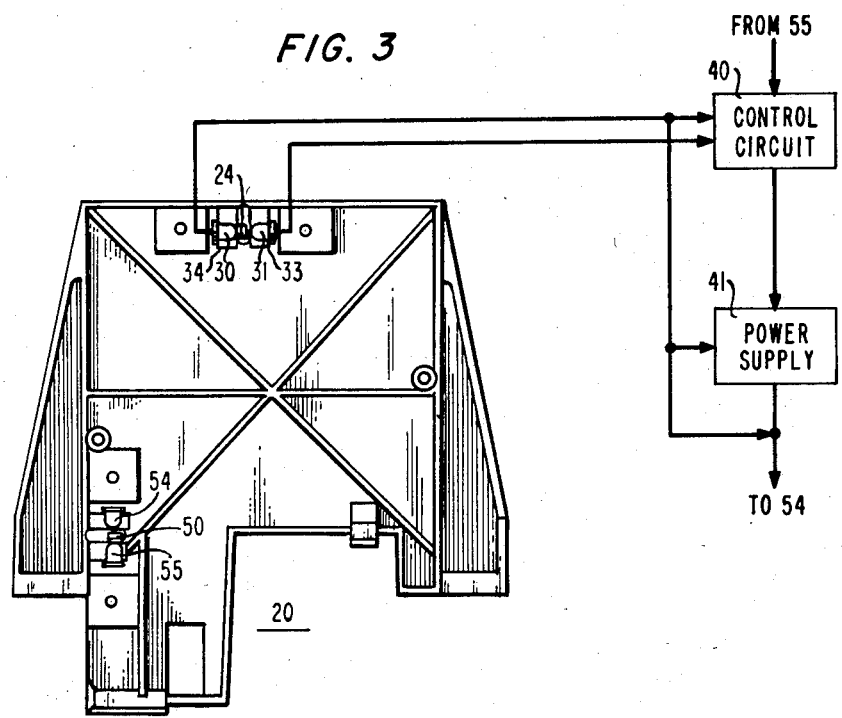
FIG. 3 is a view of the under side of the portion of FIG. 2 showing the remote end of the arm arrangement and the light path defining devices for the reader of FIG. 1.
Figure 4:
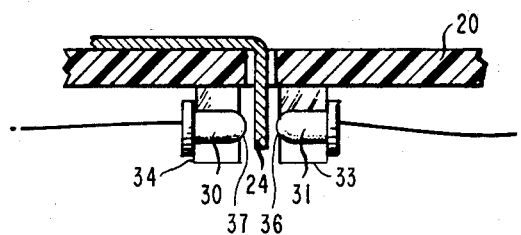
FIG. 4 is a cross section of the arm arrangement of FIGS. 2 and 3 showing the position of the arm with respect to the light path.
Figure 5:
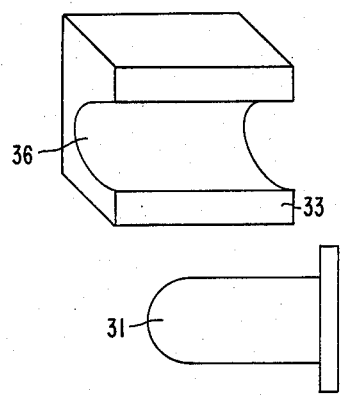
FIG. 5 is an exploded view of a light sensor and holder shown in FIG. 4.

FIG. 3 shows the underside of means 20 of FIG. 2. LED 30 and light sensor 31 define a light path between them. LED 30 and sensor 31 are mounted on means 20, by a simple snap fit engagement, into holders 33 and 34 having mating geometrics adapted to receive them. The cross section of the light path is determined merely by the openings 36, 37 of the facing ends of the holders 33 and 34.

The arm is adapted to pivot into a position (24) interrupting the light path as shown in FIG. 3. The presence of card when fully seated, thus is able to cause light path interruption without the necessity of sensitive light emitting and sensing devices being exposed to dirt or coming in contact with the card. Moreover, it should be apparent that the opacity of the card is no longer a concern in the performance of the reader. Instead, the sensitive devices are mounted on the underside of support means out of the way of contaminants.

FIG. 3 also shows a control circuit 40 and a power supply 41. Circuit 40 is connected to supply 41 for supplying power to LED 30 and sensor 31. Circuit 40 also is connected to sensor 31 in a manner to sense a signal from the sensor indicative of the presence of a card when the light path is interrupted. Such a signal is suitable for enabling the writing or reading of information on the magnetic stripe 15 of FIG. 1 as described in copending application Ser. No. 469,763 filed 2/25/83 now abandoned for R. Baus and assigned to the assignee of the present application.

An arm arrangement in accordance with this invention may include more than one arm for interrupting more than one light path or a coded set of light paths. Light responsive circuits so enabled (or disabled) may be employed to activate different sensors for reading information located, for example, in different positions depending upon the size of the card inserted. Moreover, a second arm arrangement may be adapted for detecting the insertion of a card rather than detecting the fact that the card is fully seated in a position for a read or write operation.

FIGS. 2 and 3 show a top and bottom view of support means 20 also including a second arm arrangement. The arrangement includes arm 51 rotating about stud 52. When a card inserted at 12 in FIG. 1, strikes curved portion 53 of the arm 51, the arm moves to interrupt the light path between LED 54 and sensor 55 as shown in FIG. 3. Arm 51 is biased by spring 56.

The advantages of an arrangement which is tolerant of dirt and wear and of cards of different degrees of opacity are capitalized upon, for example, by the employment of an inexpensive light sensor. Consequently, small and inexpensive sensors can be used without fear of failure during operation. One suitable light sensor may be purchased from Optron, a division of TRW Corporation item numbers OP500 SLC & OP160SLC, costing less than one dollar, in quantity.

Further, a high degree of precision can be achieved with a small hole or slot in the remote portion of the arm which interrupts the light beam. The width of the light beam is already defined mechanically by the facing openings in the snap-fit recepticals provided in support 20 for the LED or the sensor. The hole in the arm aligns with the openings 36, 37 in holder 33 or 34 when the arm is moved by the card. Thus, a precision position indicator is achieved.

What is claimed is:

1. A card reader including a channel-defining support means for receiving a card, first arm means mounted in a first position on a first face of said support means and adapted to pivot about a pivot point to a second position in response to the presence of said card in said channel, said reader also including light path defining means on a second face of said support means, said support means including a slot positioned at an end of said arm means remote from said pivot point, said arm means including an orthogonal portion extending from said remote end, said orthogonal portion being adapted to extend through said slot in a manner to interrupt a light path defined by said light path defining means when said arm means is moved to said second position.

2. A card reader in accordance with claim 1 wherein said arm means is opaque, said reader including a pair of spaced apart recesses in said light path defining means on said second face positioned astride said slot, said recesses including openings in the facing ends thereof for defining the cross section of said light path.

3. A card reader in accordance with claim 2 wherein said light path defining means includes a light emitting diode and a light sensor.

4. A card reader in accordance with claim 1 wherein said arm means comprises a single arm spring biased into said first position and positioned to be engaged by said card in a manner to be moved to said second position.

5. A card reader in accordance with claim 4 wherein said arm means is positioned to be moved by said card when said card is in a fully inserted position.

6. A card reader in accordance with claim 5 including a second arm means located adjacent said means for receiving said card and positioned to be moved by said card when said card is first inserted into said means for receiving.

* * * * *